UNITED STATES PATENT OFFICE.

HARVEY S. BRIGHT, OF VAN ALSTYNE, TEXAS.

MEDICINAL COMPOUND.

SPECIFICATION forming part of Letters Patent No. 275,352, dated April 10, 1883.

Application filed February 12, 1883. (Specimens.)

*To all whom it may concern:*

Be it known that I, HARVEY SMITH BRIGHT, a citizen of the United States, residing at Van Alstyne, in the county of Grayson, in the State of Texas, have invented a new and useful composition of matter to be used for the removal and cure in man of rheumatism, neuralgia, sprains, and frostbite, &c., and, in fact, all and every kind of inflammation where external applications as a remedy are to be used, and in beasts of the cure of meningitis, fistula, poll-evil, swinney, ring-bone, bone and blood spavin, and all other diseases of animals where external application of remedies are to be used, of which the following is a specification.

My composition consists of the following ingredients, combined in the proportions stated, to wit: corrosive sublimate, ninety grains; lunar caustic, seven grains; oil cedar, one dram; aqua-ammonia, two drams; oil sassafras, one dram; alcohol, one ounce; water, two drams; spirits of turpentine, eighteen drams. These ingredients are to be thoroughly mingled by agitation previous to their use.

The above-named composition is used externally only by rubbing the parts where the inflammation or disease exists with the composition.

By the use of the above composition the inflammation is speedily withdrawn and a cure effected of the diseases specified above, as well as of all other diseases where inflammation exists both in man and in beasts.

I hereby acknowledge and admit myself to be aware of the fact that all of the ingredients mentioned and described in the foregoing specification, except the ingredients corrosive sublimate and lunar caustic, have been united in one mixture before—to wit, in Burnham's patent, No. 62,111, of date February 19, 1867—yet, notwithstanding this, I do hereby claim that I have invented a new and useful composition of matter by the addition of the ingredients corrosive sublimate and lunar caustic to the ingredients hereby admitted to be contained in Burnham's Patent No. 62,111; but I am not aware of the fact that all of the ingredients of my composition in the proportions stated have been used together.

What I claim, and desire to secure by Letters Patent of the United States, is—

The following ingredients, combined in the proportions stated, to wit: corrosive sublimate, ninety grains; lunar caustic, seven grains; oil cedar, one dram; aqua-ammonia, two drams; oil sassafras, one dram; alcohol, one ounce; water, two drams; spirits turpentine, eighteen drams, to be used as above specified.

HARVEY SMITH BRIGHT.

Witnesses:
A. C. TURNER,
J. R. JETER.